United States Patent [19]

Makino

[11] Patent Number: 4,786,933
[45] Date of Patent: Nov. 22, 1988

[54] FOCUS DETECTION APPARATUS FOR CAMERA

[75] Inventor: Masamori Makino, Hachioji, Japan

[73] Assignee: Konica Corporation, Tokyo, Japan

[21] Appl. No.: 160,488

[22] Filed: Feb. 24, 1988

[30] Foreign Application Priority Data

Feb. 24, 1987 [JP] Japan .................... 62-39091

[51] Int. Cl.$^4$ ............................................. G03B 3/00
[52] U.S. Cl. .................................................. 354/408
[58] Field of Search .................... 354/402, 406–408; 250/201 PF, 204

[56] References Cited

U.S. PATENT DOCUMENTS

| | | | |
|---|---|---|---|
| 3,967,056 | 6/1976 | Yata et al. | 354/402 X |
| 4,333,007 | 6/1982 | Langlais et al. | 250/204 X |
| 4,368,978 | 1/1983 | Tsunehawa et al. | 354/402 X |
| 4,459,002 | 7/1984 | Sakai et al. | 354/402 |
| 4,506,150 | 3/1985 | Ogasawara | 354/402 X |

FOREIGN PATENT DOCUMENTS

| | | |
|---|---|---|
| 59-140409 | 8/1984 | Japan . |
| 60-101516 | 6/1985 | Japan . |
| 60-260926 | 12/1985 | Japan . |
| 61-35413 | 2/1986 | Japan . |

OTHER PUBLICATIONS

"Autofocus Hocus-Pocus", *Popular Science*, Mar. 1988.

*Primary Examiner*—W. B. Perkey
*Attorney, Agent, or Firm*—Frishauf, Holtz, Goodman & Woodward

[57] ABSTRACT

A focus detection system detects an in-focus position of a photographing lens on the basis of a phase difference between image signals produced from two focusing portions of an image sensor for focusing an object image, the image sensor being scanned at least two times to produce first image signals corresponding to the object image from a first scanning cycle and second image corresponding to the object image from a second scanning cycle of the image sensor. A detector is provided for detecting maximum and minimum values of the first image signals produced from the two focusing portions obtained in a first scanning cycle of the image sensor. A signal converter converts signal components of the second image signals falling within a range of the maximum and minimum values detected by the detector into digital signals, the second image signals and the signal components being obtained in a second scanning cycle of the image sensor. A processor is responsive to the output from the signal converter for calculating the in-focus position of the photographing lens based on a phase difference between the image signals produced from the two focusing portions of the image sensor in the second scanning cycle, and the lens is moved to an in-focus position responsive to the output of the processor.

15 Claims, 7 Drawing Sheets

FOCUS DETECTION APPARATUS FOR CAMERA

BACKGROUND OF THE INVENTION

The present invention relates to a focus detection apparatus for a camera which detects an in-focus condition of a photographing lens on the basis of a phase difference scheme.

Conventional focus detection systems used for autofocus (automatic focus control) cameras employ a phase difference or contrast scheme, two focusing portions are formed on an image sensor by light reflected by an object, and an in-focus position is detected on the basis of a phase difference between electrical signals from the focusing portions of the image sensor.

Figure 11A:
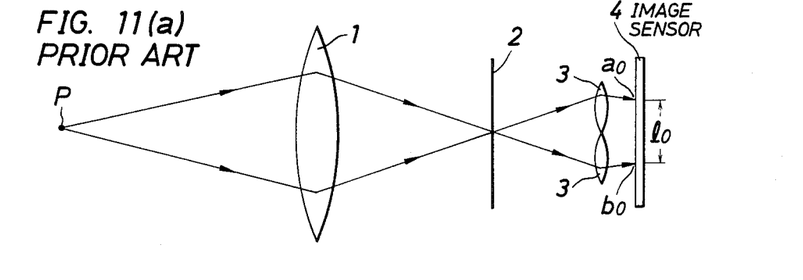
FIGS. 11(a)-11(c) and 12(a)-12(c), are views for explaining the principle of a prior art focus detection apparatus designed according to a phase difference scheme.
Figure 11B:
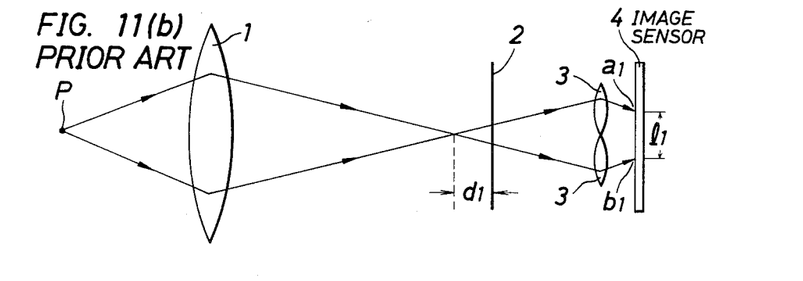
Figure 11C:
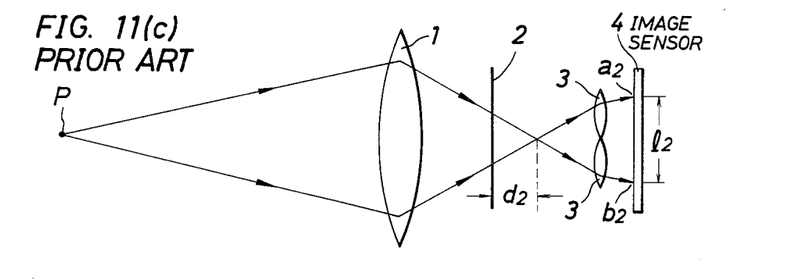
Figures 12A, 12B:
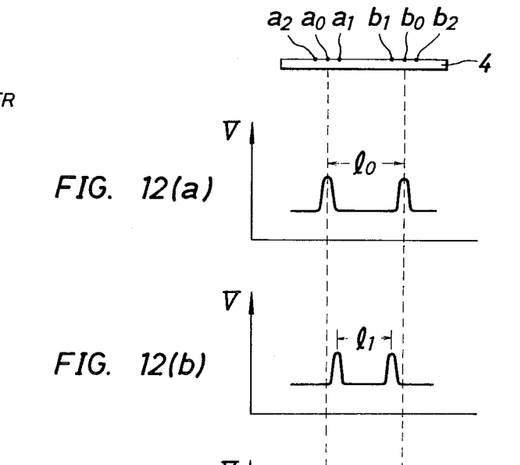
Figure 12C:
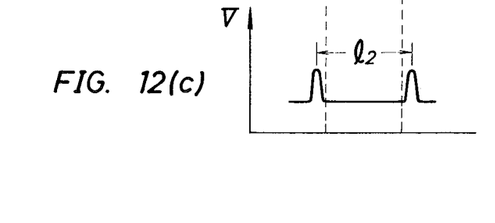

FIGS. 11(a)–(c) are views showing the principle of focus detection according to a prior art phase difference scheme employed in a single-lens reflex camera. In the in-focus state shown in FIG. 11(a), light reflected by an object P is focused on a film equivalent plane 2 through a photographing lens 1 and is split by separator lenses 3 into two light components which are then focused again at points a0, b0 on an image sensor 4. In a near-focus state shown in FIG. 11(b), the images are focused on the image sensor 4 at points a1 and b1 inside the points a0 and b0, points a0 and b0 representing the in-focus state. In a far-focus state shown in FIG. 11(c), the images are focused on the image sensor 4 at positions represented by points a2 and b2 outside the in-focus state points a0 and b0. FIGS. 12(a), 12(b), and 12(c) show in-, near-, and far-focus image signals output from the image sensor 4. As is apparent from FIGS. 11(a)–11(c) and 12(a)–12(c), the refocusing positions in the near- and far-focus states differ from those in the in-focus state. Assume that a distance between the images at points a0 and b0 in the in-focus state is defined as l0, that a distance between the images at points a1 and b1 in the near-focus state is defined as l1, and that a distance between the images at points a2 and b2 in the far-focus state is defined as l2. Defocus amounts d1 and d2 are defined as a function of image distances l1 and l2 shown in FIGS. 12(b) and 12(c). The defocus amount can be obtained on the basis of the image distance by using predetermined equations. When the photographing lens is moved by a distance represented by the defocus amount, the in-focus state in the camera can be achieved.

Figure 13:
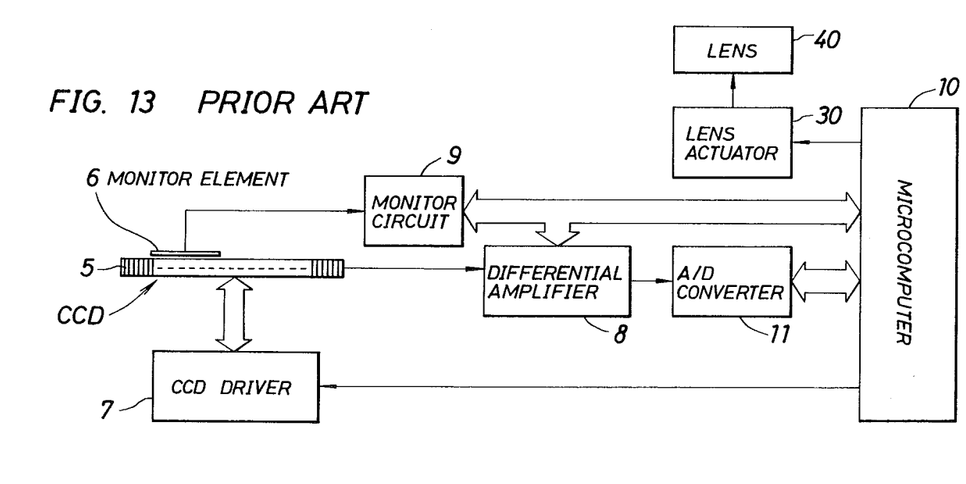
FIG. 13 is a block diagram of a prior art focus detection apparatus.

FIG. 13 is a block diagram of a conventional focus detection apparatus (shown in unexamined Japanese Patent Publication (Kokai) Nos. 59-140409, 60-101516, and 61-35413, the entire contents of which are incorporated hereby by reference) for carrying out the phase difference scheme described above. Phase detection type automatic focusing camera systems are generally well known, as shown by the article entitled "Autofocus Hocus-Pocus", Popular Science, March, 1988, the entire contents of which are incorporated herein by reference.

Referring to the prior art system of FIG. 13, CCD 5 (Charge-Coupled Device) serves as an image sensor and comprises a photodiode array, control gates, and a shift register, and is adapted to output an image signal having an amplitude proportional to the intensity of light from an object. A monitor element 6 is arranged near the CCD 5 and is adapted to output a monitor signal proportional to a charging level of the CCD 5. A CCD driver 7 is provided for outputting a drive pulse to the CCD 5, and a differential amplifier 8 amplifies an image signal from the CCD 5 to have a sufficient level so as to be subjected to A/D conversion in A/D converter 11. A monitor circuit 9 is provided for outputting a predetermined gain signal to the differential amplifier 8 and an accumulation stop signal to a microcomputer 10 when a monitor signal output from the monitor element 6 reaches a predetermined value. The A/D converter 11 converts the amplified image signal from CCD 5 into quantized data.

In operation, when a clear pulse is output from the CCD driver 7 to the CCD 5 and the monitor element 6, the photodiode array in the CCD 5 and the monitor element 6 are completely discharged. Thereafter, new charges are accumulated in the CCD 5 and the monitor element 6 in proportion to the brightness of the object being viewed. When a monitor signal output from the monitor element 6 reaches a predetermined reference value (i.e., a predetermined charge is accumulated), as detected by the monitor circuit 9, an accumulation stop signal is supplied from the monitor circuit 9 to the microcomputer 10 and the microcomputer 10 sends a stop signal to the CCD driver 7, thereby causing the CCD driver 7 to output a shift pulse to the CCD 5 and hence cause shifting of the accumulated charges from the CCD 5 to the not-shown shift register (which is part of the CCD 5). The shifted charges are output as an image signal to the differential amplifier 8. A dark output component of the CCD 5 is subtracted from the image signal input to the differential amplifier 8. The resultant signal is amplified by the differential amplifier 8 with a predetermined gain, as set by a gain signal supplied from the monitor circuit 9. The gain varies according to the object brightness detected by the monitor element 6. For example, if the object is bright, the image signal is processed at a gain of 1 (gain of differential amplifier). However, if the object is dark, the image signal is processed at a gain of, for example, 2, 4, or 8 (gain of differential amplifier) in accordance with the intensity level of the image signal. Subsequently, after amplification by the differential amplifier 8, the image signal is converted into a digital image signal by the A/D converter 11, and the resulting digital image signal is input to the microcomputer 10. The microcomputer 10 calculates a defocus amount from the digital image signal in accordance with preset data and predetermined programs which are known in the art. The microcomputer 10 outputs a drive signal to a lens actuator 30. The lens actuator 30 drives the photographing lens 40 by a distance corresponding to the defocus amount, to focus the lens on the objects, thereby completing the focusing operation.

Figure 14:
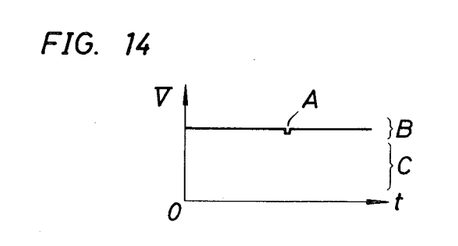
FIGS. 14 and 15 respectively show waveforms of image signals.

The monitor element 6 is located near the CCD 5 such that the width of the monitor element 6 assures detection of average luminance of the object image. The CCD 5 is charged within a charge accumulation period corresponding to the average luminance. In general, even if different objects have identical average luminance levels, the levels of contrast between the brightest and darkest portions of the objects differ from each other. In a conventional apparatus, a single gain (i.e., of differential amplifier 8) is used to process the image signals from the CCD 5 if they have identical average luminance levels regardless of contrast levels. For this reason, in the prior art system, if the object is sufficiently bright but has a low contrast level, accurate focusing cannot be detected, resulting in improper focusing and inconvenience. For example, assume that an object such as an object having a bright linear pattern on a whitish wall has a high brightness level and a low contrast level. An image signal from the CCD 5 is provided, as shown in FIG. 14. Since the average luminance level of the image signal of the object is sufficiently high, the conventional apparatus processes the image signal at a gain of 1. However, since a bump A in a curve representing the image signal is very small, a defocus amount on the basis of the phase difference described above cannot be accurately calculated (for example, a change in bump A occurs within a bit error).

The present invention has been made in consideration of the above situation, and has as its object to perform accurate focus detection regardless of contrast levels of the object.

SUMMARY OF THE INVENTION

In accordance with the present invention, a focus detection apparatus is provided for detecting an in-focus position of a photographing lens on the basis of a phase difference between image signals produced from two focusing portions of an image sensor for focusing an object image, the image sensor being scanned at least two times to produce first image signals corresponding to said object image from a first scanning cycle and second image signals corresponding to said object image from a second scanning cycle of said image sensor. The improvement according to the invention comprises detecting means for detecting maximum and minimum values of the first image signals produced from the two focusing portions obtained in a first scanning cycle of the image sensor; signal converting means for converting signal components of the second image signals falling within a range of the maximum and minimum values detected by the detecting means into digital signals, the second image signals and the signal components being obtained in a second scanning cycle of the image sensor; and means responsive to the output from the signal converting means for calculating the in-focus position of the photographing lens based on a phase difference between the image signals produced from the two focusing portions of the image sensor in the second scanning cycle.

DETAILED DESCRIPTION

Figure 15:
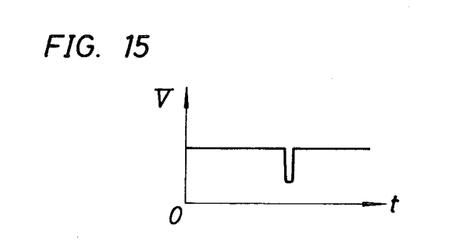

In order to achieve the above-stated object of the present invention, the following points are taken into consideration. An AC luminance component (B in FIG. 14), which is indispensable for obtaining a phase difference, and a DC component (C in FIG. 14), which is not directly required for obtaining the phase difference, are included in the image signal from the CCD 5. A ratio of the DC luminance component C to the AC luminance component B of the image signal is high in an object having a high brightness level and a low contrast level. In a conventional focusing apparatus, the image signal of such an object is amplified at a gain of 1 since its voltage level is sufficiently high. The amplified signal is then converted into a digital image signal. However, if the DC luminance component C is removed from the image signal produced by the CCD and the resultant signal is amplified at a proper gain, an image signal having a distinct contrast can be obtained, as shown in FIG. 15.

Figure 1:
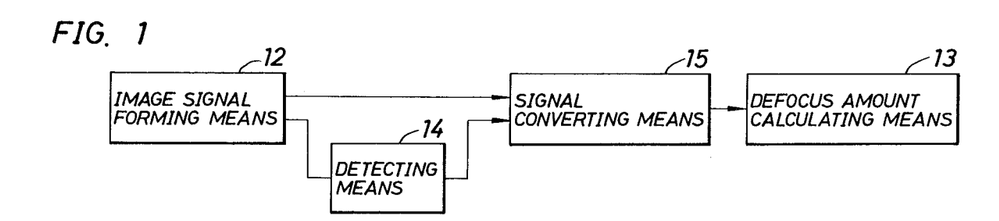
FIG. 1 is a general block diagram showing the overall arrangement of a system according to the present invention.

For this purpose, according to an embodiment of the present invention, shown in general block form in FIG. 1, a focus detection apparatus employing a phase difference scheme is provided wherein an object image is focused by an image signal forming means 12 on two focusing portions on the image sensor to output image signals. An in-focus position of the photographing lens is detected by a defocus amount calculating means 13 on the basis of image signal outputs. Maximum and minimum voltages of the image signal output in a first scanning cycle of the image sensor are detected by a detecting means 14. Of the image signals output in a second scanning cycle of the image sensor, signals falling within the range of the detected maximum and minimum voltages are converted into digital signals by a signal converting means 15. The in-focus position of the photographing lens can then be detected on the basis of the digital signals.

Figure 2:
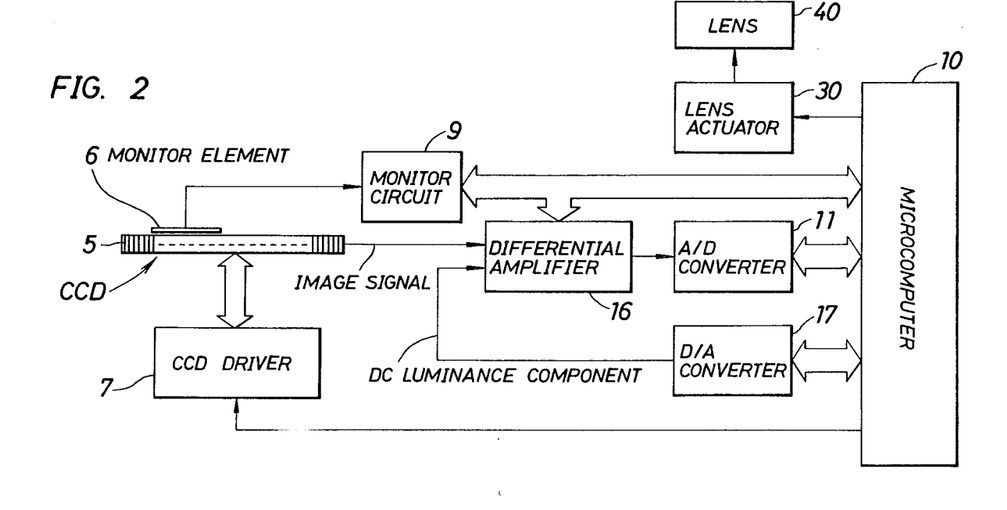
FIG. 2 is a block diagram of a focus detection apparatus for a camera according to an embodiment of the present invention.

FIG. 2 is a more detailed block diagram of a focus detection apparatus for a camera according to an embodiment of the present invention. The same reference numerals as in FIG. 13 denote the same parts in FIG. 2.

A microcomputer 10 detects maximum and minimum voltages VMAX and VMIN of the image signals output in a first scanning cycle of the CCD 5 (Charge Coupled Device) and calculates a difference therebetween. The CCD 5 incorporates a shift register therein, as is well known. The microcomputer 10 then determines, according to this calculated difference, whether a contrast level is sufficient to calculate an image distance. If the difference is smaller than reference value VL required for calculating the image distance, i.e., if $$(VMAX - VMIN) < VL \tag{1}$$

then a DC luminance component VD and a gain G are calculated as follows:

$$VD = VMIN - C1 \tag{2}$$

$$G = (VAD - C2)/(VMAX - VMIN + C1) \tag{3}$$

where C1 and C2 are constants determined in consideration of bit errors or the like of the A/D converter 11, and VAD is the dynamic range of the A/D converter 11.

An image signal component lower than the minimum voltage VMIN is regarded as a DC luminance component represented by C in FIG. 14. The DC luminance component VD can be calculated by equation (2). An AC luminance component (represented by B in FIG. 14), indispensable for calculating the image distance and included in the image signal from the CCD 5, has a range of VMAX−VMIN. The AC luminance component is amplified with a gain G calculated by equation (3) to widen its range to the dynamic range VAD of the A/D converter 11, thereby improving contrast.

Reference numeral 16 in FIG. 2 denotes an operational amplifier for subtracting the DC luminance component VD from the image signal output in a second scanning cycle on the basis of a calculation result of the microcomputer 10 and for amplifying the resulting difference at the gain G. Reference numeral 17 denotes a D/A converter for converting into an analog signal a digital value corresponding to the DC luminance component calculated by the microprocessor 10, and for outputting the analog signal to the amplifier 16.

A method of processing the image signal in the system of FIG. 2 will now be described in more detail.

Figure 3:
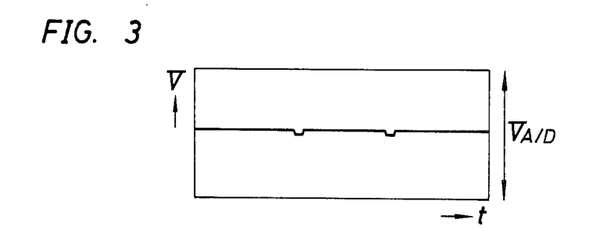
FIGS. 3 to 6 show waveforms of image signals in the system of the present invention.

Assume that an image signal shown in FIG. 3 is output from the CCD 5. More specifically, assume that VMAX=520 mV, VMIN=490 mV, and the reference value VL for calculating the image distance is given as VL=100 mV. An image signal shown in FIG. 3 has a high average luminance level and a low contrast level, which thus satisfies inequality (1). If the constants C1 and C2 are respectively set to 5 mV and 50 mV, the DC luminance component VD and the gain G are calculated according to equations (2) and (3) as follows:

$$VD = 485 \text{ mV}$$

$$G = 27 \text{ (rounded off to the nearest whole number)}.$$

Figure 4:
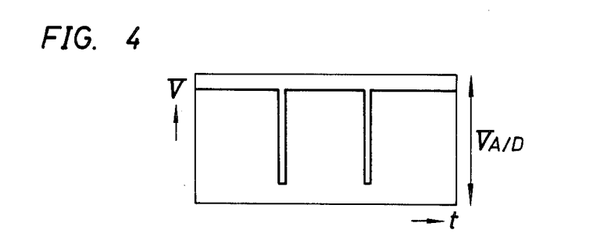

The DC luminance component VD is subtracted from the image signal output in a second scanning cycle of the CCD 5, and the difference is amplified in amplifier 16 with the gain G, whereby a signal having a high contrast level, as shown in FIG. 4, can be obtained.

Figure 5:
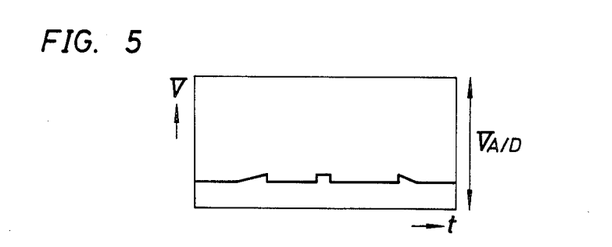

Next assume an image signal (of a dark object) having a low average luminance level, as shown in FIG. 5. If the maximum voltage VMAX=250 mV and the minimum voltage VMIN=170 mV, this signal has a low contrast level and satisfies inequality (1). The DC luminance component VD and the gain G are calculated according to equations (2) and (3) as follows:

$$VD = 165 \text{ mV}$$

$$G = 11 \text{ (rounded off to the nearest whole number)}.$$

Figure 6:
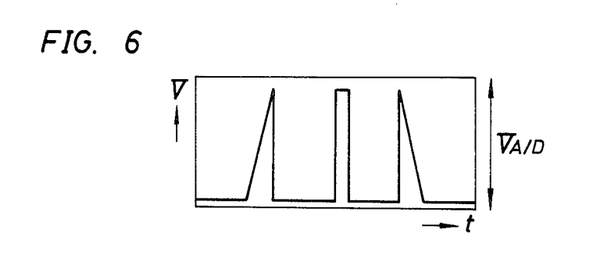

When the image signal output in the second scanning cycle of the CCD 5 is processed using the DC luminance component VD and the gain G, a signal having a high contrast level can be obtained, as shown in FIG. 6.

The operation of the embodiment of FIG. 2 will now be described in greater detail with reference to the flow chart of FIG. 7.

When a clear pulse is output from CCD driver 7 to the CCD 5 and to the monitor element 6, the photodiode array in the CCD 5 and the monitor element 6 are completely discharged, and the CCD 5 is reset (F-1). New charges are then accumulated in the CCD 5 and the monitor element 6 according to a photoelectric effect based on the object(s) being photographed. The monitor circuit 9 determines whether an output from the monitor element 6 exceeds a predetermined reference value (F-2). If YES in step F-2, an accumulation stop signal is output from the monitor circuit 9 to the microcomputer 10 (alternately referred to as a microprocessor 10). The microcomputer 10 outputs a shift signal to the CCD driver 7, and the CCD driver 7 outputs a shift pulse to the CCD 5, thereby completing charge accumulation (F-4). The charges accumulated by the CCD 5 are transferred to a shift register (part of CCD device 5) and serve as the image signals of the first scanning cycle, and the first scanning cycle image signals from the shift register are output to the differential amplifier 16 (F-5).

If a time required for automatic focusing is long in a camera, the user may lose a photographing opportunity. For this reason, the charge accumulation time of the CCD 5 cannot be excessively long. Even if the object is not so bright, the system is arranged so that a lapse of a predetermined period of time (such as 0.2 to 0.3 sec.) forcibly causes the end of charge accumulation. In this embodiment, even if an output from the monitor element 6 is less than a reference value, the microprocessor 10 determines (in step F-3) whether a predetermined period of time (e.g., 0.2 sec.) has elapsed after the CCD 5 is reset. If YES in step F-3, the accumulation is ended (F-4).

The image signal output in the first scanning cycle is converted into a digital image signal by the A/D converter 11, and the digital image signal is output to the microprocessor 10. the microprocessor 10 determines (F-6) whether the contrast level of the image signal is sufficiently high, i.e., whether the difference between the maximum and minimum voltages VMAX and VMIN is smaller than the reference value VL. If NO in step F-6, the image signal is used to calculate a defocus amount by a predetermined equation (F-16). However, if YES in step F-6, a DC luminance component VD and a gain G are respectively calculated in accordance with equations (2) and (3) (F-7). The DC luminance component VD is converted into an analog value by the D/A converter 17, and the analog signal is output to the operational amplifier 16 (F-8). The gain of the operational amplifier 16 is set to G (F-9). The CCD 5 is reset (F-10) and the second scanning cycle is initiated. The same operations as in steps F-2 to F-5 are repeated to output the image signals in the second scanning cycle (F-11 to F-14). A DC luminance component VD is subtracted from the image signal by the operational amplifier 16, the difference is amplified with the gain G, the product is converted by the A/D converter 17, and the microprocessor 10 calculates a defocus amount on the basis of the resultant value (F-16). Thereafter, the microprocessor 10 issues an instruction signal (i.e., a drive signal) to drive a lens actuator 30 to move the focusing mechanism of the photographing lens 40 by a distance corresponding to the defocus amount, thereby completing the focusing operation. According to the present invention, however, the DC luminance component VD may be subtracted from the image signal of the second scanning cycle regardless of the voltage level of the image signal of the first scanning cycle, and the difference may be then amplified with the gain G regardless of the voltage levels of the image signal of the first scanning cycle, although these operations are performed when the difference between the maximum and minimum voltages VMAX and VMIN of the first image signals in the first scanning cycle is smaller than the reference value VL. If the output from the monitor element 6 does not reach the reference value (step F-2 in FIG. 7), the DC luminance component VD may always be subtracted from the image signal of the second scanning cycle and the difference may be amplified with the gain G.

A system showing how a microcomputer determines the amount to move a lens is shown, for example, in U.S. Pat. No. 4,333,007 (corresponding to Japanese Unexamined Patent Publication No. 57-45510), the entire contents of which are incorporated herein by reference. A lens actuator 30 and a lens 40 are shown, for example, in copending U.S. application Ser. No. 061,028, filed June 10, 1987, which is a continuation of U.S. application Ser. No. 740,649, filed June 3, 1985, now abandoned, assigned to the same assignee as the present application and which corresponds to Japanese Unexamined Patent Publication (Kokai) No. 60-260926, the entire contents of which are incorporated herein by reference.

Figure 8:
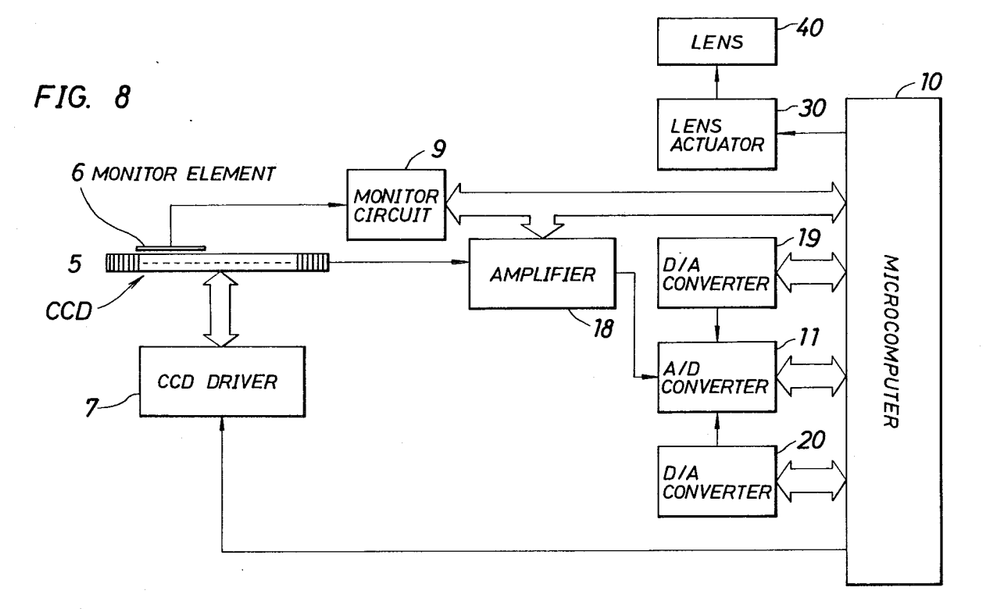
FIG. 8 is a block diagram showing a second embodiment of the present invention.

FIG. 8 shows a focus detection apparatus according to another embodiment of the present invention. The same reference numerals as in FIG. 2 denote the same parts in FIG. 8.

Referring to FIG. 8, reference numeral 18 denotes an amplifier for amplifying an image signal with a predetermined gain; 19 denotes a D/A converter for converting into an analog signal a maximum voltage VMAX of an image signal output from a microcomputer 10 and for supplying the analog signal to an A/D converter 11; and 20 denotes a D/A converter for converting into an analog signal a minimum voltage VMIN of the image signal output from the microcomputer 10 and for supplying the analog signal to the A/D converter 11.

Figure 9:
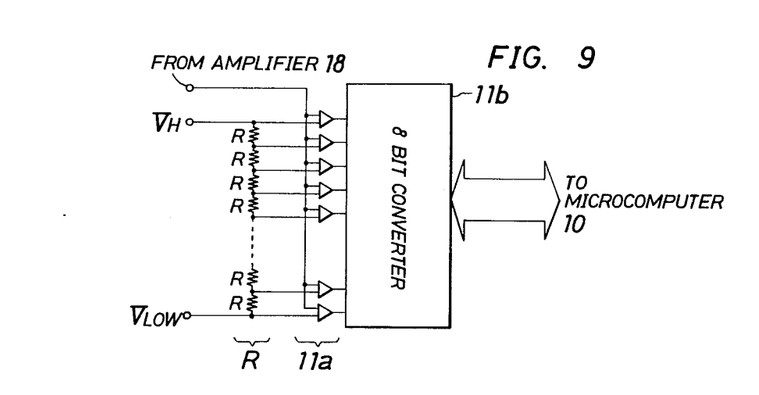
FIG. 9 is a circuit diagram of an A/D converter used in the embodiment FIG. 8.

As shown in FIG. 9, the A/D converter 11 comprises resistors R for dividing a voltage difference between a lowest analog reference voltage VLOW and a highest analog reference voltage VH into 256 intervals, comparator 11a for discriminating a voltage level of the image signal output from the amplifier 18, and an 8-bit converter 11b. A maximum voltage VMAX of the image signal from the D/A converter 19 is input as the highest analog reference voltage VH, and a minimum voltage VMIN of the image signal from the D/A converter 20 is input as the lowest analog reference voltage VLOW.

More specifically, by defining the maximum voltage VMAX of the image signal as the highest analog reference signal VH of the A/D converter 11 and the minimum voltage VMIN of the image signal as the lowest analog reference signal VLOW of the A/D converter 11 is in this embodiment, the DC luminance component is removed from the image signal, and only the AC luminance component (B in FIG. 14) of the image signal within the range of VMAX to VMIN can be extracted. The resultant signal is converted into a digital signal, thereby obtaining an image signal having a high contrast level.

Figure 7:
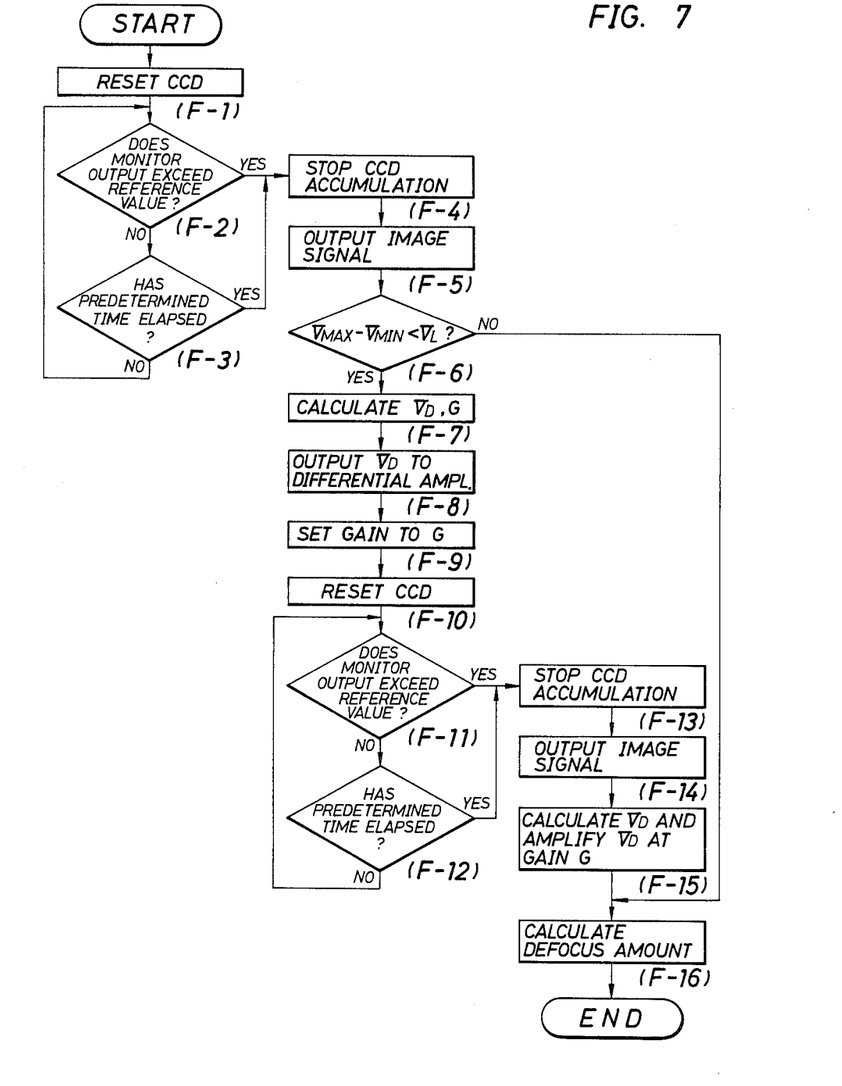
FIG. 7 is a flow chart for explaining the operation of the embodiment of FIG. 2.
Figure 10:
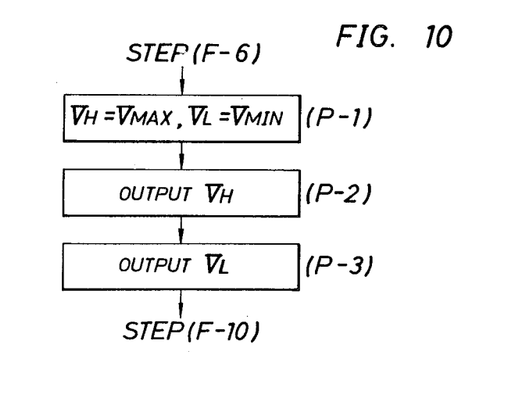
FIG. 10 is a flow chart for explaining the operation of the embodiment of FIG. 8.

The operation of the embodiment of FIGS. 8 and 9 is substantially the same as that of FIGS. 2 and 7, except that steps P-1 to P-3 in the flow chart of FIG. 10 replace steps F-7 to F-9 in the flow chart of FIG. 7. The microprocessor 10 determines (F-6) whether a difference between the maximum and minimum voltages VMAX and VMIN of the image signals is smaller than a reference value VL. If NO in step F-6, the image signal is used to calculate a defocus amount according to predetermined equations (F-16). However, if YES in step F-6, the maximum voltage VMAX is set as the highest analog reference voltage VH and the minimum voltage VMIN of the image signal is defined as the lowest analog reference voltage VLOW (P-1). The maximum analog reference voltage VH is output from the D/A converter 19 to the A/D converter 11 (P-2), and the lowest analog reference voltage VLOW is output from the D/A converter 20 to the A/D converter 11 (P-3). Thereafter, the CCD 5 is reset (F-10), and the second scanning cycle is initiated. The resultant image signal is output to the A/D converter 11 through the amplifier 18. Since the highest and lowest analog reference voltages VH and VLOW, respectively, are set in the A/D converter 11, the DC luminance component is removed from the image signal, and only the AC component (B in FIG. 14) of the image signal falling within the range of VMAX and VMIN is extracted. The extracted AC luminance component is converted into a digital signal, and the digital signal is output to the microcomputer 10.

Unlike in the first embodiment, an image signal having a high contrast level can be obtained without the use of a differential amplifier such as amplifier 16 of FIG. 2.

In summary, according to the present invention as described above, the maximum and minimum voltages of the image signals output in the first scanning cycle of the image sensor are detected by the detecting means. The image signal outputs in the second scanning cycle of the image sensor are converted by the signal converting means into digital signals within the range of the previously detected maximum and minimum voltages. The desired in-focus position of the photographing lens is detected on the basis of the digital output from the signal converting means. The defocus amount is calculated on the basis of the AC luminance component (B in FIG. 14) which is indispensable for calculating a phase difference of the image signals. Therefore, accurate focusing can be performed regardless of the contrast levels of the object.

According to the present invention, since the DC component is removed from the image signal, the A/D converter can be effectively used within its entire dynamic range. In addition, the dark output of the image sensor can be eliminated together with the DC luminance component. Therefore, a dark output subtractor can be omitted, thus simplifying the circuit arrangement.

According to the second embodiment of the invention shown in FIGS. 8-10, the image signal can be processed without the use of a differential amplifier, thereby further simplifying the circuit arrangement.

Various changes and modifications may be made within the scope of the inventive concepts.

I claim:

1. In a focus detection apparatus for detecting an in-focus position of a photographing lens on the basis of a phase difference between image signals produced from at least two focusing portions of an image sensor for focusing an object image, said image sensor being scanned at least two times to produce first image signals corresponding to said object image from a first scanning cycle and second image signals corresponding to said object image from a second scanning cycle of said image sensor, the improvement comprising:
detecting means for detecting maximum and minimum values of said first image signals produced from said at least two focusing portions obtained in a first scanning cycle of said image sensor;

signal converting means for converting signal components of said second image signals falling within a range of the maximum and minimum values detected by said detecting means into digital signals, said second image signals and said signal components being obtained in a second scanning cycle of said image sensor;

calculating means responsive to the digital signal output from said signal converting means for calculating the in-focus position of the photographing lens based on a phase difference between the image signals produced from said two focusing portions of said image sensor in said second scanning cycle; and means responsive to said calculating means for focusing said photographing lens to said in-focus position to thereby focus said object image.

2. The focus detection apparatus of claim 1, wherein said calculating means includes means for determining whether a difference between the maximum and minimum values detected by said detecting means is less than a predetermined reference value, and for then calculating said in-focus position on the basis of the digital signal output from said signal converting means if a difference between the maximum and minimum values detected by said detecting means is less than said predetermined reference value.

3. The focus detection apparatus of claim 2, wherein said maximum and minimum values are maximum and minimum voltages, respectively.

4. The focus detection apparatus of claim 3, wherein, when said difference between the maximum and minimum voltages detected by said detecting means is less than said predetermined reference value, said calculating means calculates a DC luminance component (VD) and a gain (G); and wherein said apparatus further comprises amplifying means for subtracting said DC luminance component (VD) from said image signal output in said second scanning cycle, and for amplifying the resulting difference at said gain calculated by said calculating means.

5. The focus detection apparatus of claim 4, wherein said amplifying means comprises a variable gain differential amplifier.

6. The focus detecting detection apparatus of claim 4, wherein said signal converting means converts the amplified difference signal into said digital signals.

7. The focus detection apparatus of claim 4, wherein said DC luminance component, calculated by said calculating means, is a digital signal, and further comprising a digital-to-analog converter for converting said digital signal corresponding to said DC luminance component into an analog signal, which analog signal is coupled to said amplifying means for subtraction from said image signal output in said second scanning cycle.

8. The focus detection apparatus of claim 7, wherein said image sensor comprises a charge coupled device, and a monitor element coupled thereto for monitoring the charge on said charge coupled device.

9. The focus detection apparatus of claim 8, further comprising a monitor circuit coupled to said monitor element for determining whether an output from said monitor element exceeds a given value, and for outputting a "stop" signal when said output from said monitor element exceeds said given value, said "stop" signal being coupled to said calculating means to end said first scanning cycle.

10. The focus detection apparatus of claim 1, wherein said image sensor comprises a charge coupled device, and a monitor element coupled thereto for monitoring the charge on said charge coupled device.

11. The focus detection apparatus of claim 10, further comprising a monitor circuit coupled to said monitor element for determining whether an output from said monitor element exceeds a given value, and for outputting a "stop" signal when said output from said monitor element exceeds said given value, said "stop" signal being coupled to said calculating means to end said first scanning cycle.

12. The focus detection apparatus of claim 3, further comprising amplifying means for amplifying said image signal output in said second scanning cycle.

13. The focus detection apparatus of claim 12, wherein said amplifying means comprises a variable gain amplifier, the gain of which is set by an output from said calculating means.

14. The focus detection apparatus of claim 13, wherein said signal converting means converts the output of said amplifying means into digital signals and supplies said digital signals to said calculating means.

15. The focus detection apparatus of claim 1, further comprising a first digital-to-analog converter coupled to said calculating means for converting said maximum voltage of said image signal into a first digital signal; and a second digital-to-analog converter coupled to said calculating means for converting said minimum voltage of said image signal into a second digital signal; the outputs of said first and second digital-to-analog converters being coupled to said signal converting means; and wherein said signal converting means including means for converting said image signal of said second scanning cycle into digital signals only within the range between said maximum and minimum voltages, thereby extracting an AC luminance component of said image signal of said second scanning cycle, and thereby obtaining an image signal having a high contrast level.

* * * * *